Figure 1:
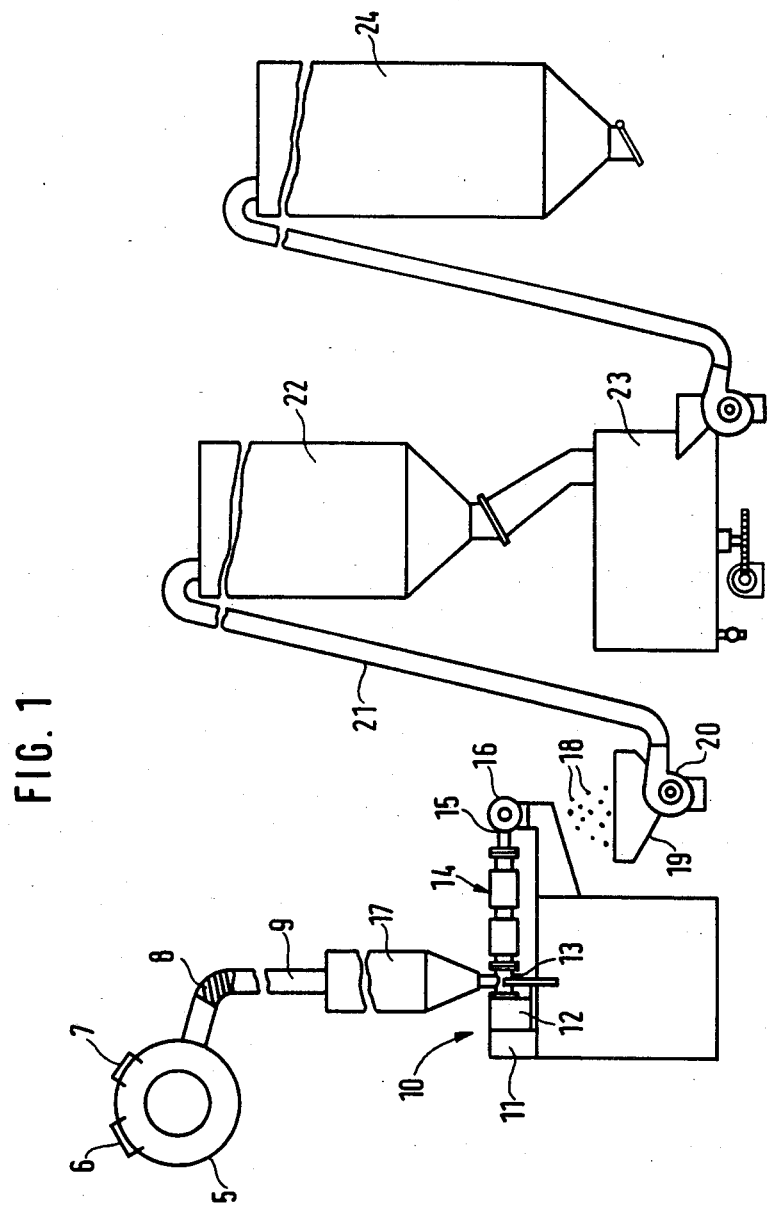

United States Patent [19]

Voss

[11] Patent Number: 4,627,947

[45] Date of Patent: Dec. 9, 1986

[54] PROCESS FOR PRODUCING POURABLE SPHERICAL-SEGMENT-SHAPED PACKING MATERIAL PARTICLES MADE OF PLASTIC

[75] Inventor: Gerd Voss, Metzingen, Fed. Rep. of Germany

[73] Assignee: Storopack, Hans Reichenecker GmbH & Co., Metzingen, Fed. Rep. of Germany

[21] Appl. No.: 677,055

[22] Filed: Nov. 30, 1984

[30] Foreign Application Priority Data

Jun. 16, 1984 [DE] Fed. Rep. of Germany ....... 3422425

[51] Int. Cl.[4] .............................. C08J 9/16; C08J 9/14; B28B 9/02
[52] U.S. Cl. ....................................... 264/53; 264/142; 264/DIG. 5; 264/DIG. 13; 425/311; 425/817 R; 521/57; 521/60
[58] Field of Search ..................... 264/45.1, 51, 54, 55, 264/142, 53, DIG. 5, DIG. 13; 425/587, 311, 817 R; 521/57, 60

[56] References Cited

U.S. PATENT DOCUMENTS 3,961,000 6/1976 Ropiequet ........................... 264/142

*Primary Examiner*—Philip Anderson
*Attorney, Agent, or Firm*—John F. Witherspoon

[57] ABSTRACT

In the case of a process for producing pourable spherical-segment-shaped packing material particles (18) made of plastic which have an external convex and an internal concave surface, the plastic material is mixed with additives, such as bubble forming agents, coloring pigments and similar agents. The plastic material is fed, by means of a feeding funnel (17) into an extruder (14) through an opening in a bush (13) surrounding the extrusion screw. The plastic material plasticizes over the course of the extruder (14) and, because of the difference in speed existing over the cross section of the mass, comes out of an opening (15) in the die with a bent surface. The plastic material is cut off directly at the opening (15) of the die and before any considerable expansion has taken place. Before the processing of the plastic granules in the extruder (14) a bubble-forming agent (nucleation agent) is applied to their surface in a drum (5).

5 Claims, 1 Drawing Figure

PROCESS FOR PRODUCING POURABLE SPHERICAL-SEGMENT-SHAPED PACKING MATERIAL PARTICLES MADE OF PLASTIC

This invention relates to a process for producing pourable spherical-segment-shaped packing material particles made of a plastic material which have an external convex and an internal concave surface, where the plastic material is mixed with additives such as bubble-forming agents, coloring pigments or similar substances, and by means of a feeding funnel, is fed into an extruder through an opening in a bush surrounding the extrusion screw, where the plastic material is plasticized in the course of the extruder and, because of the difference in speed existing over the cross section of the mass, comes out of an opening in the die with a bent surface, and the extruded plastic material is cut off directly at the opening of the die and before any considerable expansion has taken place.

A process of this type is known from U.S. Pat. No. 3,961,000. In the case of this process, the expandible polystyrene (EPS) is mixed with additives. The additives consist of bubble-forming agents, such as bicarbonate of ammonia and sodium bicarbonate or similar substances and coloring pigments.

It should be understood that the terms "cell-forming" and "cells" can be used throughout the specification in lieu of the terms "bubble-forming" and "bubbles", respectively.

Via a supply funnel, the mixture is fed into an extrusion device. An extrusion screw transports the mixture through the extruder, where because of the special design of the extrusion screw, i.e. an increasing core diameter as well as a suitable temperature program, the plastic material is plasticized in the course of the extruder. Immediately after the plastic material comes out of an opening in the die, it is cut off by means of a cutting device, in which case it is made possible for the cut-off particles to expand in a first expansion process into the special shape with a convex outside and a concave inside surface. The packing material particles are processed to their final condition in several subsequent expanding processes.

Polystyrene is a polymerization product of the benzene derivative styrene, and according to the conditions of representation, has polymers of varying chain lengths. The chain lengths is significantly determined by how many styrene units were "chained to one another" during the polymerization.

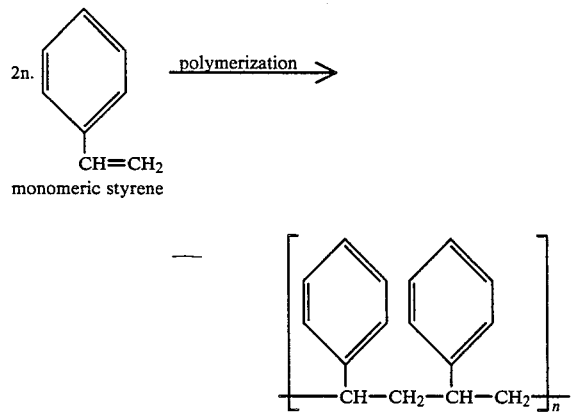

The chain length essentially determines the physical characteristics of the plastic material. In order for the plastic material to be processed in an extruder, it must be "thermoplastic". This means that the plastic material which is firm at a certain temperature (usually at room temperature) becomes plastic (soft, moldable) when the temperature is increased and can then be processed to a certain shape and after cooling resumes its firm condition.

For the processing in the extruder, two different basic types of polystyrene are available:
(a) the so-called standard polystyrene
(b) a polystyrene containing an expanding agent.

The standard polystyrene is a pure polymer, i.e., a pure polystyrene without additives. In the case of the polystyrene containing an expanding agent, an expanding agent is included in the polymer matrix which boils at an increased temperature and foams the polymer. Such expanding agents are preferably low-boiling hydrocarbons, fluorohydrocarbons or water.

Standard polystyrene types as well as polystyrene types containing expanding agents are suitable for processing into foamed materials on the extruder. When standard polystyrene is used, it is necessary to add an expanding agent to the extruder during processing. In that case, one speaks of a so-called direct gassing.

The expanding agent causes the plasticized material to foam after leaving the extruder.

The expanding agent, in the extruder, is released under pressure in gaseous form in the plasticized plastic mass. The plastic mass is supersaturated with gas, i.e., because of the conditions (pressure, temperature) existing in the extruder, more gas is released than under normal conditions.

After leaving the extruder, the expanding agent tries to bubble down and to expand to normal pressure. The sticky plastic mass surrounding the expanding agent prevents the propellant gas from escaping into the atmosphere and therefore results in the foamed structure.

By cooling the plastic material in the indicated shapes, the typical structure of the blocks of foamed material is obtained.

In the case of large-volume blocks of foamed material, such as insulating boards, the size of the foam bubbles is relatively large, and the diameter of these bubbles fluctuates over a considerable range.

In the case of the present process, however, small packing material particles are produced, the diameter of which is about up to three centimeters. In the case of these small packing particles, the size of the bubbles must naturally be much smaller than in the above-described cases in order to ensure the stability of the packing particle material. Only a few large bubbles in these small packing particles decrease stability and even under little stress result in a breaking of the particles. Larger bubbles, especially in the edge area of the packing particles having a surface that is convex on the outside and concave on the inside lead to a considerable danger of "crumbling" in this edge area, so that because of the constant friction during the transport a fine rubbed-off snow will be created.

There is also the danger that during the re-expanding processes, such as they are carried out in the process of the initially mentioned type, if individual larger bubbles are created, these become larger and the packing particles are destroyed during these expanding processes.

In order to achieve a more uniform formation of bubbles, so-called "nucleation agents" may be added. These nucleation agents cause a nucleation of bubbles in the plasticized plastic material. From a chemical point of view, this takes place by the fact that the solid nucleation agents decompose in the extruder while forming gas.

The released gas has the objective of forming in the plasticized plastic material a larger number of nuclei of bubbles. This resulting gas, as far as the term is concerned, must be clearly separated from the propellant gas. The propellant gas which under pressure is released in the plastic material, diffuses into the small bubbles and causes the expansion of the nuclei of the bubbles created by the decomposition of the nucleation agent.

In the technique, nucleation agents are preferably used that do not carry harmful gases, decomposing into carbon dioxide, nitrogen or similar gases.

The raw materials used in the process must correspond to the German Food Law. According to FDA requirements, all components must be GRAS (GENERALLY RECOGNIZED AS SAFE). The most often used materials are carbonates, such as carbonate of ammonia or sodium carbonate. Sodium hydrogen carbonate has, for example, also been used widely as a propellant in backing powders since at an increased temperature it separates carbon dioxide.

The required quantity of nucleation agent is determined by the decomposition behavior of the nucleation agent at a rising temperature. The so-called theoretical gas yield in this case plays a significant role. The theoretical gas yield is determined by the released quantity of gas (such as carbon dioxide) per unit of weight. Since the gas yield increases with rising temperature, small quantities of nucleation agent are required at high processing temperatures.

In the case of relatively low processing temperatures of about 110°–130° C., the conventional nucleation agents cannot be used economically because they have an optimal processing temperature range of 180°–230° C. In addition, the formation of bubbles in regard to their size and their spatial distribution per volume element of plasticized plastic mass is very irregular, which after leaving the extruder results in an irregular cell structure of the expanded plastic material.

It is the objective of the invention to improve a process of the initially mentioned type in such a way that in the case of a relatively low processing temperature of the plastic material in the extruder and small additions of nucleation agent, an even formation of a large number of bubbles is made possible.

This objective is achieved by the fact that on the surface of the plastic granules, before their processing in the extruder, the bubble forming agent (nucleation agent) is applied.

Before its application, the solid nucleation agent is ground to an extremely fine substance. The grain size in this case is about $40\mu$.

The finely ground nucleation agent, in a drum is "drummed" onto the plastic granules. The quantity of the "drummed-on" nucleation agent is about 0.1–0.2 percent by weight with respect to the weight of the granules.

The nucleation agent may especially advantageously consist of a carbonate and an acid component. The acid component, in addition to the effect of the heat, by the chemical effect on the carbonate component, makes possible a development of carbon dioxide. The acid component consists of citric acid and there are therefore no reservations based on the food law.

Of decisive significance in regard to a uniform quality of the packing material particles produced according to this process is the formation and the expansion of gas bubbles.

The formation of bubbles takes place by the fact that the nucleation agent releases a gas in the plasticized plastic material. The release of gas, as mentioned before, can take place only by the thermic splitting-up of the carbonate, or in addition by reactions between the acid component and the carbonate component. Since the carbonates are salts of the weak acid carbonic acid, the carbonic acid can be pushed out of their compounds by stronger acids, in this case citric acids.

The conventional propellants are so-called exothermal systems, during the decomposition of which large quantities of heat are released. The danger of the formation of heat accumulation, i.e. local overheating, leads to an uneven formation of bubbles.

The propellant used in this process is an endothermally effective system. With an increasing temperature, an even decomposition of the propellant and thus more finely celled and more uniform foamed structures are obtained. The decomposition behavior of the nucleation agent depends essentially on the added quantity of heat (temperature stress through outside heating and inside friction).

The solid nucleation agent must be evenly and finely distributed in the plasticized plastic material so that per volume element potential nuclei exist that are as numerous as possible and as small as possible. It is then ensured that when the formation of gas occurs, a uniform finecelled foam will be created in the extruder.

According to the invention, this is achieved by the fact that the nucleation agent, before the plastic material granules are pulled into the extruder, is distributed on these granules so that it adheres to them evenly, in which the case the grain size is of very decisive significance.

The finely ground nucleation agent (grain size about $40\mu$) is "drummed onto" the granules of plastic material is a drum. The term "drummed onto" is used here in order to differentiate it clearly from the mixing of the granules of plastic material with the nucleation agent, as it is carried out in the state of the art. This mixing may also take place in mixing drums so that a clear difference must be made between the two processes, as far as the terminology is concerned.

Figuratively, the granules of plastic material, after they have left the drum, are different from one another because of the fact that after the "drumming-on" the granules of plastic material look like, for example, an apple iced with confectioners sugar, whereas after the mixing, the granules look as if an apple had been sprinkled with sugar crystals. The adherence of the "sugar crystals" in the state of the art is achieved by adding bonding agents, such as talc to the mixture. In the case of the drumming-on, no bonding agents are required since the fine "powder" adheres well to the surface.

When one follows the path of the differently treated (mixed or drummed-on) granules from the mixing drum through the extruder, the difference can be made particularly clear using the "apple example".

The granules (apples) in the funnel are in a constant movement, and in the pull-in zone of the extruder, where they are not yet plasticized, are turned into different directions and rubbed against one another. The granule (apple) first carries out an essentially vertical movement through the funnel and subsequently in the extruder, by the propelling sides of the extrusion screw, is moved into a direction that can be divided into two components. One movement is the axial movement through the extruder and the other movement is the circular movement around the axis of the extruder.

Over the course of the extruder, because of the increase of the core diameter of the screw, the space for the granules (apples) decreases continuously.

Through the rubbing-against-one-another of the individual granules (apples) because of the advancing and rotating movement and because of the increasing densification, a relatively extensive rubbing-off takes place on the granules with the coarse nucleation agent (apples with sugar crystals), the rubbed-off material collecting especially in the hollow spaces between the granules.

In the case of the granules with the drummed-on nucleation agents (apples with confectioners sugar icing), a layer exists that adheres firmly because of the adhesive forces and is distributed evenly over the surface. The rubbing-off of nucleation agent on the path of the granule (apple) through the funnel and the material pull-in zone is much less, and therefore hardly any material is collected in the spaces between the granules (apples).

In the plasticizing zone of the extruder, i.e., in the zone where the granules become soft, the granules no longer rub against one another but are squeezed together or kneaded together. However, this kneading-through in the extruder is only a rough mixing of components.

In the microscopic range, a certain "close order" is still maintained despite this mixing.

In the case of the drummed-on granules of plastic material, after the collapse of the solid phase by plasticizing, the spatial distribution of the still firm nucleation agent is very regular. This means that in any volume element, numerous very fine nuclei of bubbles are evenly distributed.

In contrast, in the case of the originally only mixed granules (i.e., the plastic material and the nucleation agent are only mixed and not drummed on), there are in certain areas many and relatively large solid matter particles of the bubble nuclei present, whereas in other areas there are almost no bubble nuclei present, but only much plasticized plastic material with the propellant released in said material.

Because of the small grain size and the fine distribution, even at low processing temperatures of about 110°–130° C.—thus far below the processing range of 180°–230° C. considered as optimal in the state of the art—a sufficient decomposition of the nucleation agent takes place with the formation of numerous and very small bubbles.

The first phase, i.e. the formation of the nuclei and thus of the bubbles, is improved decisively by the drumming-on of the nucleation agent, and considerable costs are saved because of the low processing temperature.

The second important aspect concerning the quality of the end product is the increase in the size of the gas bubbles. In the initial phase, the increase in size of the gas bubbles still takes place by means of the occurring gas of the nucleation agent. However, the further increase in size, especially during the re-expanding processes, takes place by means of the propellant released in the plastic material.

Decisive for the growth of the bubbles is the pressure within the bubbles and the pressure of the released agent in the extruder and the pressure in the extruder itself. The relationship between these pressures can be described by means of the following reaction equations:

$$\Delta P = P_v - P_l \tag{1}$$

$$\Delta P = 2\sigma/R \tag{2}$$

In these equations, $P_v$ is the existing pressure on the inside of the bubble;
$P_l$ is the partial pressure of the released propellant gas in the melted plastic material;
$\Delta P$ is the difference in pressure (i.e. the "driving force");
$\sigma$ is the surface tension of the bubble;
$R$ is the radius of the bubble.

While the bubble grows, the pressure in the bubble decreases, while the radius increases continuously. At the beginning, it grows very fast until a large part of the excessive released gas was used up in the adjacent area to expand the polymer.

The growth of the bubbles is influenced by the diffusion rate of the released propellant in the melted plastic material in the direction of the bubble as well as by the degree of supersaturation and the viscosity of the melted mass. In the state of equilibrium, the balance of forces exists that is described by equations (1) and (2).

In the case of a starting material that is only mixed (apple with sugar crystals), uneven growth rates of the bubbles exist because of the irregular spatial distribution. Zones with a lot of plastic material and much released propellant alternated with other zones which contained relatively large amounts of nucleation agent and where gas bubbles were created that are relatively large and grew rapidly and in regard to the pressure of the propellant have no vacuum in the gas bubbles. They cause an increased diffusion of the propellant into the bubble resulting in an increased rate of growth of these already large bubbles. The mixing or the "fractionation" taking place in the extruder by means of the screw, i.e. a milling-through of the plasticized mass with an occasional cell collapse of the foam structure is not sufficient for controlling an uneven foam structure in regard to arrangement and size.

The invention is explained in details by means of an embodiment.

FIG. 1 is a diagrammatic side view of a device for producing packing material particles.

The device required to carry out the process is shown in diagram form in FIG. 1 and has a drum 5 provided with openings 6 and 7 through which the plastic material and the finely ground nucleation agent are added. From the drum 5, the drummed-on plastic granules, by means of a conveying device 8 and a conveying pipe 9, are fed into an extrusion device 10.

The extrusion device 10 consists of a driving motor 11, a gear 12, a material pull-in zone 13 and an extruder 14. A cutting device 16 is arranged directly in front of an opening 15 of the die of the extruder 14.

The drummed-on granules, via a feeding funnel 17, reach the extruder 14 through the material entrance zone 13.

The plastic material is plasticized over the longitudinal course of the extruder; the nucleation agent decomposes while forming gas, and the plastic material comes out of the opening 15 in the form of a mass of melted foam. Because of the difference in speed existing over the mass cross section, the plastic foam squeezes out of the inside area of the opening 15 of the die with a bent surface.

The extruded plastic is cut off by means of the cutting device 16 directly at the opening 15.

The cut-off plastic particles expand in the free fall in a first expanded condition, already taking their shape of having a surface that is concave on the inside and convex on the outside. A collecting container 19 collects the solidified and cooled plastic particles 18.

The initially expanded foamed particles by means of a blower 20 are transported through a pipe 21 into a storage container 22.

After a certain storage period, the initially expanded plastic particles 18 are conveyed from the storage container 22 into a re-expansion unit 23 where the plastic particles are re-expanded.

After leaving the re-expansion unit 23, the re-expanded plastic particles 18 are conveyed to a storage container 24. This storage container 24 preferably consists of a sieve material or any other open-mesh material permitting a free circulation of air and thus an easier drying of the newly expanded plastic particles 18.

The plastic packing particles that are expanded to their final condition have an even and uniform cell structure. The particles have such stability that the pressure affecting the packing material during transport does not result in a breaking of the packing material particles. In addition, the individual particles are closed off in themselves by a relatively smooth surface so that not much "crumb formation" takes place when the individual packing material particles rub against one another.

When carrying out this process, the nucleation agent is first ground to a grain size of 40μ. The nucleation agent is based on the multi-component nucleation agent that is known under the trademark of "Hydrocerol". The acid component consists either of water-repellent anhydrocitric acid or of citric acid monohydrate. The acid component is treated or coated in such a way that it is water-repellent and can thus be mixed with the carbonate component (sodium hydrogen carbonate) and can be stored for long periods without drawing humidity from the environment.

The nucleation agent CF 0556 is a fine, odorless, white, free-flowing, non-dusty powder. According to FDA requirements, all components of CF 0556 are GRAS (Generally Recognized as Safe). CF 0556 can be stored well without clotting or sticking-together because of moisture absorption.

The plastic granules consisting of expandable polystyrene (EPS), i.e., polystyrene with incorporated propellant (for example, pentane) are fed into the drum 5.

For each 70 kg EPS granules, 100 g CF 0556 nucleation agent are drummed on. In the case of this process which must not be confused with a pure mixing, an evenly distributed layer of the fine nucleation agent places itself on the plastic granules. The addition of so-called bonding agents in the form of talc or similar substances is not necessary, because the very fine coating of adheres well to the granules. The proportion of nucleation agent is 0.14 percent by weight.

The drummed-on granules, by means of the conveying device 8, via conveying pipe 9, are fed into the feeding funnel 17. Coloring pigments or other desirable additives may be added to the feeding funnel. The mixture is pulled into the material pull-in zone 13 of the extruder 14 by means of the extrusion screw.*) Over the course of the extruder 14, the material, because of an increase of the core diameter of the extruder screw, is plasticized by the friction and by heat supplied correspondingly from the outside.

*)The pull-in zone 13 is more fully described in my application filed concurrently herewith (Ser. No. 677,054), which disclosure is incorporated herein by reference.

The drummed-on granules, on their surface, have the evenly distributed about 40μ large solid matter particles of the nucleation agent. In the transition phase from the solid to the plasticized condition, the granules are squeezed against one another, without significantly destroying the close order of the particles arranged on the surface. When the plastic particles are squeezed and sheared, the overall mixing is still somewhat improved. This can be demonstrated by imagining that a softly chewed piece of chewing gum is made into a ball and this ball is then pulled apart between two fingers. The stretching will take place so evenly that the regularity of particles on the surface will be maintained.

The processing temperature of the plastic material is approx. between 110°-130° C. Even at these low temperatures, the nucleation agent CF 0556 develops carbon dioxide. Because of the fine distribution, considering the overall volume, an evenly distributed formation of bubbles that increases at a uniform speed is achieved. The size of the bubbles also depends on the dimensions of the extruder and the speed of the extruder screw. Immediately after the extruded plastic comes out and is cut off, a rapid expansion of the plastic particles will take place because the compressed gasses in the bubbles can expand to almost normal pressure.

At the same time, the plastic particles are cooled and are maintained in a first expanded shape. In this first expanded shape, the initially expanded packing material particles have a bulk density of about 22 kg/m$^3$. They have an extremely fine-celled structure making the surface of the packing material particles very smooth. The packing material particles, after a rest, will then be re-expanded.

During this rest period, the propellant existing in the plastic material diffuses from the plastic material into the bubbles. The inside pressure within the bubbles, because of the rapid expansion after leaving the extrusion screw, is much less than the partial pressure of the released propellant in the plastic material, in which case this difference in pressure is the driving force for the diffusion and also determines the direction.

The further expansion processes are carried out in such a way that the packing particles are exposed to a vapor atmosphere, causing the propellant that had diffused into the bubbles to expand and expanding the plastic particle. The storage periods between the individual expanding processes become continuously longer, because less and less propellant gas is released in the plastic material and less can therefore diffuse into the bubbles. After several expanding processes, the packing particles have a bulk density of only about 4.5 kg/m$^3$.

Despite the numerous expanding processes, the packing material particles have a relatively smooth surface and, because of the fine-celled structure have sufficient stability. Especially at the edge zones, the packing particles are smooth and round so that there is no danger of a crumb formation between the parts that are stacked into one another under stress.

By means of the drumming-on of the 40μ nucleation particles on the plastic granules, the basis is created for the quality of the end product.

I claim:

1. A process for producing pourable spherical-segment-shaped packing material particles made of an expanded plastic which have an external convex and an internal concave surface, where granules of plastic material containing an expanding agent are mixed with additives, such as cell-forming agents (nucleating agents), color pigments or similar substances, and by means of a feeding funnel, is fed into an extruder through an opening in a bush surrounding the extrusion screw, where the plastic material is plasticized in the course of the extruder and, because of the difference in speed existing over the cross section of the mass, comes out of an opening in the die with a bent surface, and the extruded plastic material is cut off directly at the opening of the die and before any considerable expansion has taken place, the improvement wherein a cell-forming agent (nucleating agent) having a grain size of less than about 40μ is uniformly distributed and adhered on the surface of the plastic granules before their processing in the extruder in an amount less than 0.2 percent by weight based on the weight of said granules.

2. A process according to claim 1, wherein the processing temperature in the extruder is about 110°–130° C.

3. A process according to claim 1 or 2 wherein said plastic material is expandable polystyrene (EPS).

4. Plastic granules made of expandable polystyrene (EPS) having adhered on their surfaces in uniformly distributed layers a cell-forming agent (nucleating agent) having a grain size of less than about 40μ and in an amount less than 0.2 percent by weight based on the weight of said granules.

5. The plastic granules of claim 4 wherein the nucleating agent consists of a carbonate component and of an acid component.

* * * * *

UNITED STATES PATENT AND TRADEMARK OFFICE
CERTIFICATE OF CORRECTION

PATENT NO. : 4,627,947
DATED : December 9, 1986
INVENTOR(S) : Gerd Voss

It is certified that error appears in the above-identified patent and that said Letters Patent is hereby corrected as shown below:

Column 1, line 22, change "expandible" to -- expandable --

Column 1, line 48, change "lengths" to -- length -- in second instance

Column 3, line 61, insert a comma after "drum"

Column 4, line 41, delete "the" in first instance

Column 8, line 19, change "gun" to -- gum --

Column 7, line 64, delete "of" in first instance

Signed and Sealed this

Twentieth Day of October, 1987

Attest:

DONALD J. QUIGG

Attesting Officer

Commissioner of Patents and Trademarks